(12) United States Patent
Martin

(10) Patent No.: US 6,186,583 B1
(45) Date of Patent: Feb. 13, 2001

(54) FRONT PANEL BODYWORK ELEMENT FOR AN AUTOMOBILE INCLUDING A REINFORCING ELEMENT

(75) Inventor: Laurent Martin, Peaugres (FR)

(73) Assignee: Inoplast, Saint Desirat (FR)

(*) Notice: Under 35 U.S.C. 154(b), the term of this patent shall be extended for 0 days.

(21) Appl. No.: 09/417,631

(22) Filed: Oct. 14, 1999

(30) Foreign Application Priority Data

Oct. 16, 1998 (FR) .................................................. 98 13163

(51) Int. Cl.⁷ ........................................................ B60J 7/00
(52) U.S. Cl. ........................................ 296/194; 296/203.02
(58) Field of Search .................................... 296/194, 193, 296/203.01, 203.02, 901; 293/115; 180/68.4, 68.6

(56) References Cited

U.S. PATENT DOCUMENTS

| | | | |
|---|---|---|---|
| 4,141,426 | * | 2/1979 | Hamada . |
| 4,979,854 | * | 12/1990 | Charles . |
| 5,123,695 | * | 6/1992 | Kenemitsu . |
| 5,219,016 | * | 6/1993 | Bolton . |
| 5,409,288 | * | 4/1995 | Masuda . |
| 5,597,198 | * | 1/1997 | Takanishi . |
| 5,636,885 | * | 6/1997 | Hummel . |
| 5,658,041 | | 8/1997 | Girardot et al. . |
| 5,941,329 | * | 8/1999 | Ichioka . |

FOREIGN PATENT DOCUMENTS

| | | |
|---|---|---|
| 0658470 | 6/1995 | (EP) . |
| 2761331 | 2/1998 | (FR) . |

\* cited by examiner

Primary Examiner—D. Glenn Dayoan
Assistant Examiner—Mickki D. Murray
(74) Attorney, Agent, or Firm—Dowell & Dowell, P.C.

(57) ABSTRACT

A composite front panel bodywork element for an automotive vehicle which includes a stamped metal reinforcement defining a cavity in which is seated a portion of a plastic support structure for mounting functional elements associated with the vehicle thereto. The plastic support structure is mounted relative to the metallic reinforcement so as to define open channels therebetween.

8 Claims, 3 Drawing Sheets

FRONT PANEL BODYWORK ELEMENT FOR AN AUTOMOBILE INCLUDING A REINFORCING ELEMENT

BACKGROUND OF THE INVENTION

1. Field of the Invention

The present invention relates to a process for manufacturing a front face of an automobile vehicle, and to such a front face.

2. Brief Description of the Related Art

A front face or front chassi panel is conventionally mounted at the front of the engine compartment of an automobile vehicle, between the side members or the arms of the chassis, and generally supports a radiator and a system for locking the hood of the vehicle in closed position.

For many years, the front faces were made of metal, but the use of metal proved to limit the shapes that could be used. Automobile vehicle front faces were then made of plastics, in particular polyamide resin, possibly reinforced with reinforcing fibers. These plastic front faces have the noteworthy drawback of being considerably deformed in the event of shock, to such an extent that the lock that they support may be disconnected from the corresponding part of the hood.

European Patent Application 0 370 342 discloses producing an element of light construction, in particular for an automobile vehicle, which is composed of a base body in the form of a shell and of reinforcing ribs made of injected plastics material. This element is produced by overmoulding the base body with a glass-fiber reinforced polyamide resin, which leads to a relatively high cost due to the price of the raw material used. In addition, overmoulding necessarily involves the base body being shaped with high precision in order not to interfere with the mould when the latter is closed. In effect, dimensional variations of the base body might result in the mould being jammed, and even in the matrix or punch being damaged. In addition, the points of injection of the plastics material in the mould around the base body must be positioned with precision, and the flow of the plastics material is considerably disturbed in the event of an obstacle being positioned in front of these points of injection. Finally, charging and discharging of the mould are relatively long operations due to the necessarily precise positioning of the base body before the mould is closed.

European Patent Application 0 658 470 discloses making a support frame for an automobile vehicle frontage in which a framework may be fixed in grooves, recesses or housings in an overall plane frontal panel. The fixing of the framework in the panel does not allow it to rigidify this panel efficiently.

It is an object of the present invention to overcome these drawbacks by proposing a process of manufacture and an automobile vehicle front face which are particularly economical, without risk of interference of the parts with a mould or a manipulating robot, while the shock resistance of the part obtained is quite satisfactory.

SUMMARY OF THE INVENTION

To that end, the invention relates to a process of manufacturing a bodywork element of an automobile vehicle, in which a reinforcement is formed, a part made of plastics material is moulded to form a functional support, and said reinforcement and said part are assembled by mechanical fixation or ultrasonic welding, characterized in that the process consists in:

forming a reinforcement by stamping a metal plate, and assembling said reinforcement and said part by introducing said part in a volume for reception, defined by said reinforcement.

Thanks to the process of the invention, the metal reinforcement may be made by conventional stamping techniques, i.e. at a high rate, therefore a well controlled cost, the manufacturing tolerances being in accordance with the rules of the art. Furthermore, the structural part forming functional support may be moulded in accordance with conventional tested techniques, likewise with tolerances in accordance with the rules of the art. Mechanical assembly or welding of these parts allows possible dimensional defects to be compensated, with the result that the part obtained has a geometry defined with precision. Thanks to the introduction of the plastic part in the volume defined by the reinforcement, a two-layer body is formed around at least one part of the plastics part, with the result that the rigidity of the assembly obtained is improved, which ensures that the lock of the hood remains efficient, including in the event of a violent shock.

According to variant embodiments of the invention, it may be provided to assemble the reinforcement and the part forming functional support by clipping, cooperation of shapes, riveting, clinching, snapping, stapling or bolting. These different tested techniques may be carried out with excellent reliability and under satisfactory economic conditions.

According to an advantageous aspect of the invention, the process consists in equipping the reinforcement and/or the support-forming part with functional elements of the vehicle, before assembly of the reinforcement and the support-forming part. These functional elements may be constituted by the lock for closing the hood, elements belonging to the motor fan unit, electric cables, fluid conduits and/or optical elements of the vehicle headlights. Thanks to this aspect of the invention, the elements which vary from one vehicle to another, in particular as a function of the level of equipment, may be pre-assembled either on the reinforcement or on the support-forming part, the final assembly being made as a function of the type of front face to be obtained.

According to another advantageous aspect of the invention, the process consists in moulding the part forming functional support by injection or compression of polyester resin. The use of polyester resin makes it possible to obtain a very advantageous cost as polyester resin is of relatively low cost, in particular compared to polyamide resin.

The invention also relates to a front face of an automobile vehicle which may be manufactured by the process described hereinabove and, more specifically, to a front face of an automobile vehicle which comprises a metal reinforcement and a part made of moulded plastic material, forming functional support and assembled with this reinforcement by mechanical fixation or by ultrasonic welding. This front face is characterized in that the reinforcement is of concave shape and defines a housing for receiving at least a part of the support-forming part.

According to advantageous aspects of the invention, this front face incorporates one or more of the following characteristics:

- the support-forming part and/or the reinforcement is provided with means for fixing and/or supporting functional elements of the vehicle;
- the assembling between reinforcement and the support-forming part is removable;
- the concavity of the reinforcement faces the engine compartment of the vehicle;

a covering is mounted on the reinforcement and/or the support-forming part, such covering forming a partition preventing recycling of the air of the engine compartment of the vehicle;

the support-forming part and/or the covering is specifically adapted to the type of vehicle and to its equipment, while the reinforcement is compatible with different types of vehicles or with vehicles with different types of equipment.

BRIEF DESCRIPTION OF THE DRAWINGS

The invention will be more readily understood on reading the following description of an embodiment of a front face of an automobile vehicle and of its process of manufacture, given solely by way of example and with reference to the accompanying drawings, in which.

DESCRIPTION OF PREFERRED EMBODIMENT

Figure 1:
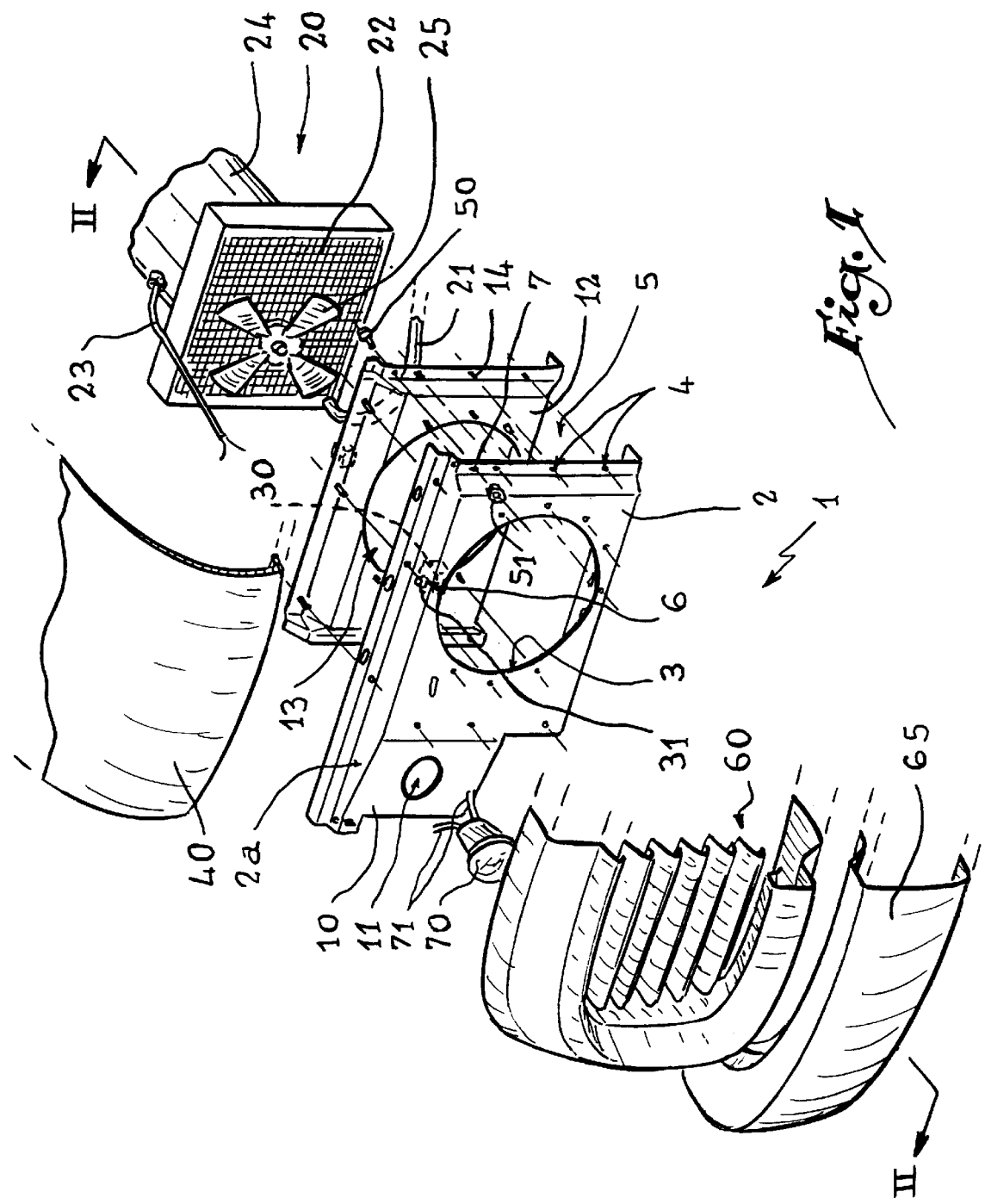
FIG. 1 is an exploded view in perspective of a front face of an automobile vehicle according to the invention.

Referring now to the drawings, the front face 1 of the automobile vehicle shown therein comprises a metal reinforcement 2 shaped by stamping from a metal sheet of small thickness, for example a sheet of thickness included between 0.5 and 1.5 millimeters. The reinforcement 2 comprises a central opening 3 and holes 4 whose function will appear more clearly hereinbelow. The geometry of the reinforcement 2 is such that its concavity faces the engine compartment of the vehicle, with the result that it defines a volume or cavity 5 for partially receiving a part 12 made of injection-moulded polyester resin. Part 12 is a functional support structure for elements of the front face 1.

According to a variant of the invention, the part 12 may also be made of thermoplastic resin.

The part 12 comprises a central opening 13 whose geometry is substantially equivalent to that of the recess 3 of the reinforcement 2, opening 3 and 13 being provided to be globally aligned with each other.

Part 12 also bears a plurality of snapping elements 14 distributed opposite the holes 4 of the reinforcement 2. Thanks to elements 4 and 14, it is possible to assemble the reinforcement 2 and the support-forming part 12 mechanically, by snapping.

Figure 2:
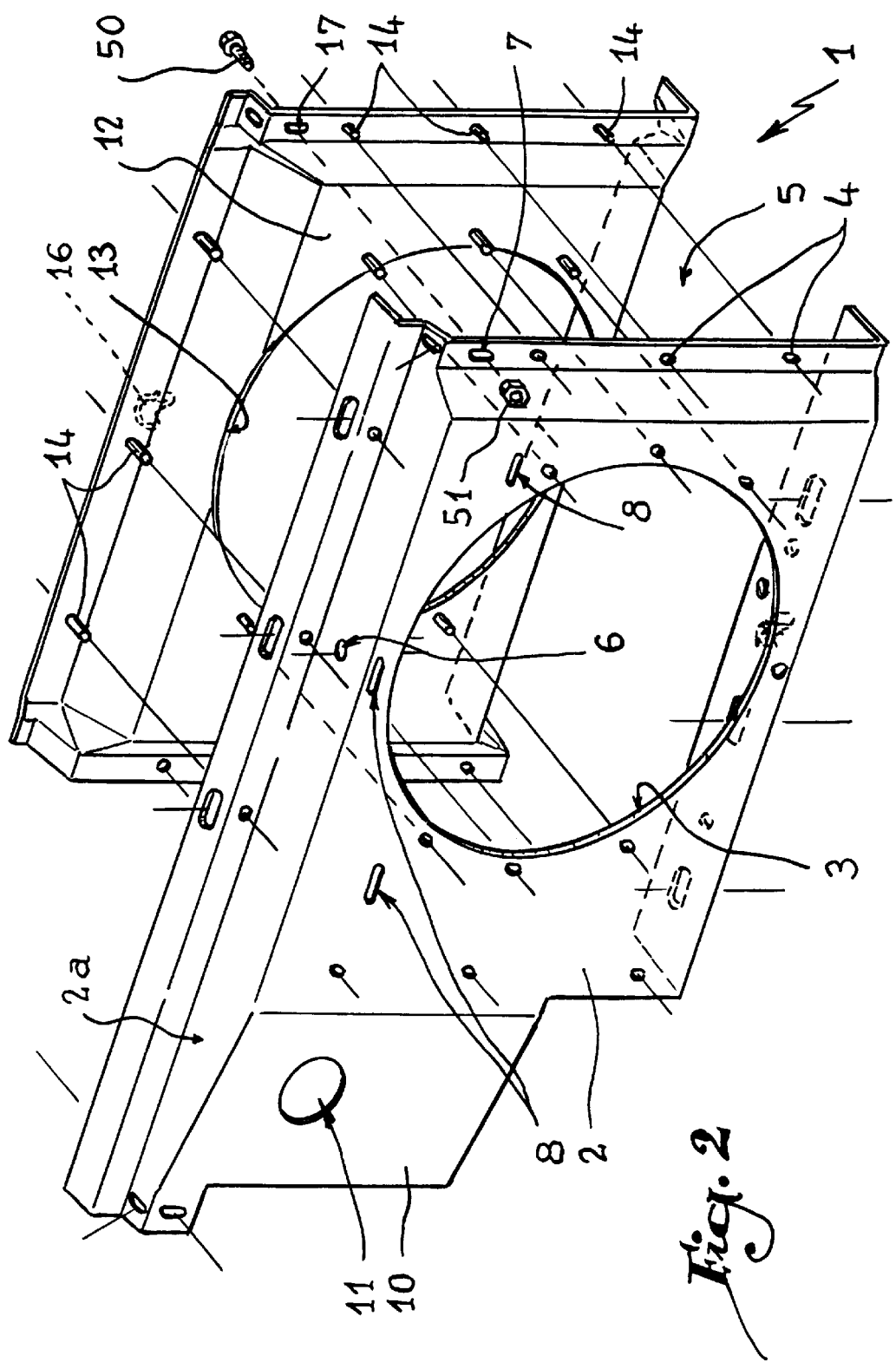
FIG. 2 is a view in perspective, on a larger scale, of the reinforcement and of the support-forming part of the front face of FIG. 1.

A motor fan unit 20 is provided to be mounted on part 12. To that end, part 12 bears tabs 15 for fixing and supporting conduits 21 supplying the radiator 22 of the motor fan unit 20 with cooling liquid. One tab 15 only is visible in FIG. 3, but it is obvious that a plurality of tabs may be provided as a function of the number and geometry of conduits 21. Similarly, a plurality of fastenings, of which only one, referenced 16, is visible in FIG. 2, are provided on the surface of the part 12 facing the engine compartment in order to immobilize electric cables 23 for supplying a motor 24 for rotating a fan 25 of the motor fan unit 20.

In order to facilitate assembly of elements 20 to 25, it is possible to equip part 12 with all these elements, prior to assembly thereof with the reinforcement 2. The operator can work flat, essentially on one side of the part 12, which facilitates his work and reduces the risks of error.

Similarly, the reinforcement 2 supports a lock or latch 30 intended to cooperate with a hood 40. The lock 30 is housed beneath an upper flange 2a of the reinforcement 2, inside the volume 5, while a barrel 31 of the lock 30 traverses an orifice 6 of the reinforcement 2. The lock 30 is mounted on the reinforcement 2 before assembly of this reinforcement with the part 12.

After partial introduction of the part 12 in the volume 5, the elements 14 for snapping are deformed in order to lock elements 2 and 12 together.

Other techniques of mechanical fixation may be envisaged for assembling elements 2 and 12. In particular, the cooperation of shapes, stapling or clipping enable satisfactory results to be obtained, while the assembling effected is removable. It is also possible to proceed by riveting or clinching, i.e. riveting by orbital deformation, which is particularly rapid and efficient.

Finally, the technique of bolting may also be used alone or in combination with one of the techniques mentioned above, as represented by screw 50 and nut 51 visible in FIG. 2 and provided to be mounted together after passage of the screw 50 through two holes 7 and 17 of elements 2 and 12. Each nut 51 may advantageously be fixed on the reinforcement 2 when it is shaped by stamping.

According to another technique, and taking into account the nature of the materials used, elements 2 and 12 may be assembled by ultrasonic welding, which is a rapid, tested technique.

In any case, it is possible to combine the techniques mentioned hereinabove or to use only one of them, as a function of the geometry and size of the elements to be assembled.

Figure 3:
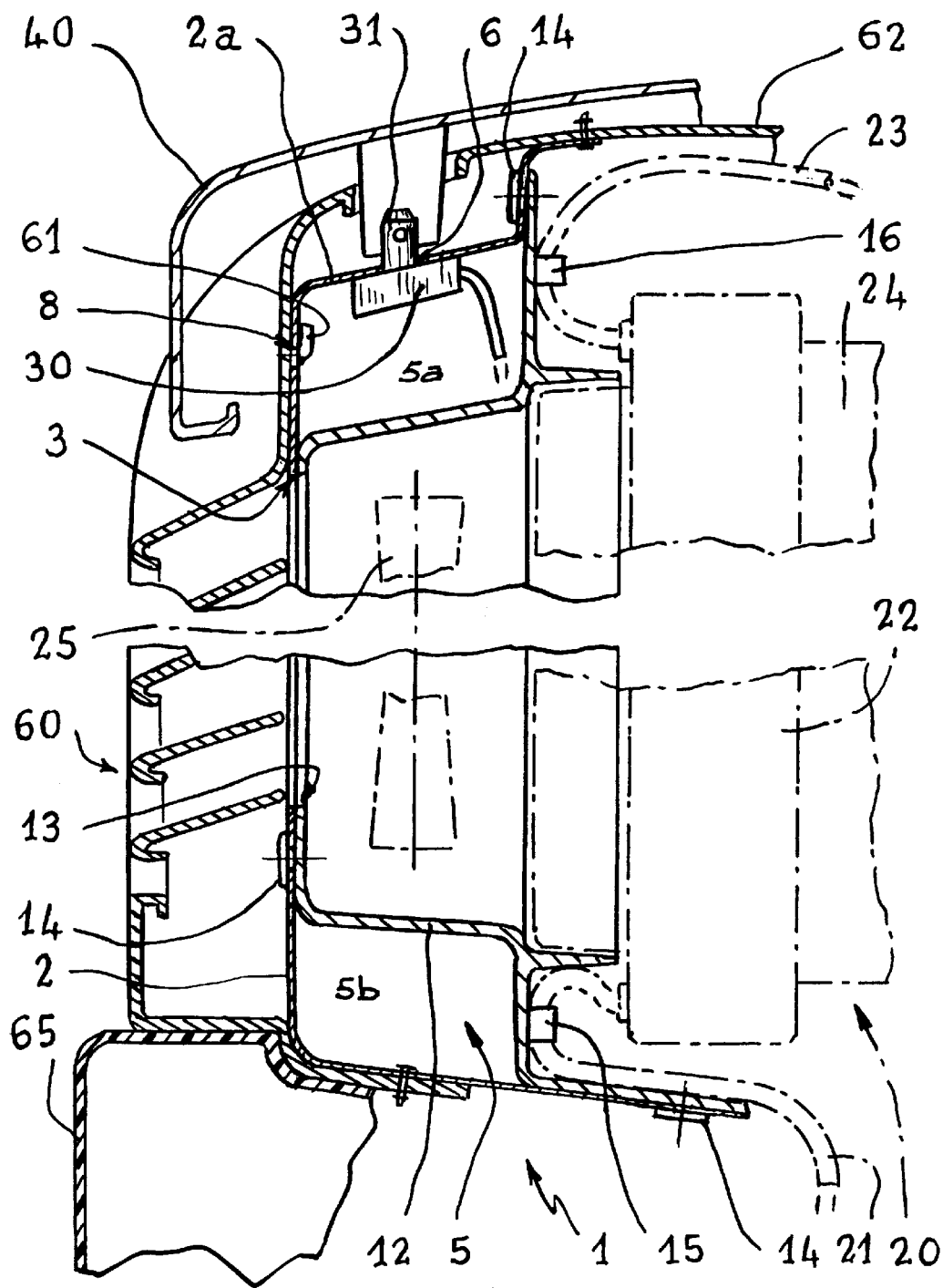
FIG. 3 is a longitudinal section along line II—II of the front face of FIG. 1, in assembled position.

Due to the introduction of the part 12 in the volume 5 and taking into account the respective dimensions of the volume 5 and that part of part 12 introduced in this volume, upper and lower channels 5a and 5b are formed between elements 2 and 12, the lock 30 being installed in channel 5a, as shown in FIG. 3. In this way, elements 2 and 12 together form a hollow body whose inertia is greater than that of a non-hollow body, which enables it to withstand more efficiently the forces to which it is subjected, in particular in the event of violent shock, as the reinforcement 2 partially envelops the part 12. Other channels, of the type such as channels 5a and 5b, may, of course, be provided, for example to the left and to the right of the part 12, inside the volume 5.

A radiator grill 60 is provided to be fixed in the upper part of the reinforcement 2 and the part 12, in order to constitute a decorative element of the vehicle and a grill for air admission and protection of the fan 25. The radiator grill 60 may be fixed on the reinforcement 2 by any appropriate means and, for example, by clipping tabs 61 provided to penetrate in corresponding orifices 8 in the reinforcement 2.

In the upper part, the radiator grill 60 extends in a wing 62 forming a partition preventing recycling of the air of the engine compartment of the vehicle, which avoids a recirculation of the air heated by the engine which would reduce the efficiency of the engine cooling system.

A bumper 65 is provided to be mounted, below the radiator grill 60, on the front face 1.

As is more clearly visible in FIG. 2, the reinforcement 2 is not symmetrical with respect to a vertical plane passing through the centre of the opening 3. It comprises a lateral flange 10 provided with a recess 11 for receiving headlight optics 70. The electrical bundle 71 of the headlight optics 70 may be immobilized with respect to the reinforcement 2 or the part 12 with the aid of fastenings 16. It would, of course, also be possible for the reinforcement 2 to comprise a second flange for receiving second headlight optics.

With the foregoing in mind, it is possible to create a front face 1 integrating a large number of functions, before this front face is assembled on the vehicle.

Thanks to the reinforcement 2, this front face can withstand the shocks that the vehicle might undergo and, in particular, the destructive safety trials provided by the standards. The reinforcement 2 is a part of relatively simple geometry, therefore of attractive price, as it is not directly in contact with the elements of the vehicle engine.

A reinforcement 2 may be provided to be usable with several types of vehicles or with all vehicles of a given type, whatever their equipment. As for the part 12, which may be mass-produced in smaller quantities with greater flexibility, it is defined as a function of the exact type of vehicle and its equipment, for example, presence or absence of an air-conditioning unit or a power-assisted steering unit whose fixation may be provided on part 12 turned towards the engine compartment, by means of appropriate fastenings.

The invention therefore allows considerable modularity to be obtained in the manufacture of the front faces, it being understood that the reinforcements 2 may be prepared at their site of stamping with the elements 30 and 70, while the different parts 12 forming functional support may be fitted, at their site of moulding, with the accessories corresponding exactly to the vehicles to be manufactured. Equipped reinforcement 2 and part 12 may be assembled on the vehicle production site as a function of the automobile builder's schedule, or at a fitter's.

In the same way, the radiator grill 60 may be specifically adapted to the type of vehicle and to its equipment, for example by integrating housings for anti-fog headlights, this radiator grill being assembled on the reinforcement 2 and/or part 12 simultaneously at their assembly or thereafter.

In any case, the reinforcement 2 and the part 12 may be made with tolerances in accordance with usage in their respective technical domains, mechanical assembly or ultrasonic welding allowing such tolerances. The reinforcement 2 and the part 12 may be assembled manually or automatically.

What is claimed is:

1. A motor vehicle front chassis panel for supporting functional elements of the vehicle forwardly of an engine compartment, the panel including a stamped metal reinforcement having a front surface and a rear concave face defining a cavity adapted to be oriented toward the engine compartment, said metal reinforcement including an upper flange adapted to have at least one of the functional elements mounted thereto, a plastic support structure for mounting at least one of the functional elements thereto, said plastic support structure being at least partially mounted within said cavity so as to form an hollow upper channel between said support structure and said upper flange of said metal reinforcement, and means for securing said plastic support structure to said metal reinforcement.

2. The motor vehicle front chassis panel of claim 1 further including a lower hollow channel defined between said plastic support structure and said metal reinforcement.

3. The motor vehicle front chassis panel of claim 1 including means for securing a plurality of functional elements to said plastic support structure.

4. The motor vehicle front chassis panel of claim 1 wherein said means for securing includes removable fasteners.

5. The motor vehicle front chassis panel of claim 1 including a grill mounted forwardly of said front surface of said metal reinforcement, said grill including a partition extending rearwardly of said plastic support structure and adapted to prevent recycling of air from the engine compartment toward said front surface of said metal reinforcement.

6. The motor vehicle front chassis panel of claim 1 in which each of said metal reinforcement and said plastic support structure include openings therein which are aligned with one another.

7. The motor vehicle front chassis panel of claim 1 in which said plastic support structure is molded of polyester resin.

8. A process for manufacturing the front chassis panel for a motor vehicle of claim 1 including the steps of:
 a. stamping said metal reinforcement
 b. molding said plastic support structure, and
 c. thereafter assembling said plastic support structure to said metal reinforcement.

* * * * *